(12) United States Patent
Horiuchi et al.

(10) Patent No.: US 6,646,869 B2
(45) Date of Patent: Nov. 11, 2003

(54) PORTABLE ELECTRONIC APPARATUS, DISK DRIVE UNIT, LOADING MEMBER, AND COMPUTER HOUSING

(75) Inventors: Mitsuo Horiuchi, Sagamihara (JP); Fusanobu Nakamura, Yamato (JP); Fumio Tamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 09/945,971

(22) Filed: Sep. 4, 2001

(65) Prior Publication Data

US 2002/0067592 A1 Jun. 6, 2002

(30) Foreign Application Priority Data

Sep. 4, 2000 (JP) ........................................ 2000-267035

(51) Int. Cl.$^7$ ................................................. H05K 5/02
(52) U.S. Cl. ...................... 361/685; 361/686; 361/747; 312/223.1; 248/560
(58) Field of Search ................................. 361/683–685, 361/686, 747, 754, 732, 688, 715; 174/52.1; 312/223.1, 223.2; 62/3.2, 3.7, 3.3; 206/307, 308, 312; 248/560–562, 632, 300, 506; 220/4.02; 24/563, 545, 295; 29/453, 525.01

(56) References Cited

U.S. PATENT DOCUMENTS

| | | | | | |
|---|---|---|---|---|---|
| 5,311,455 | A | * | 5/1994 | Ho | 361/685 |
| 5,971,780 | A | * | 10/1999 | Youn | 439/160 |
| 6,160,703 | A | * | 12/2000 | Lopez | 361/685 |
| 6,176,001 | B1 | * | 1/2001 | Boe | 29/453 |
| 6,201,691 | B1 | * | 3/2001 | Nagarajan | 361/685 |
| 6,434,000 | B1 | * | 8/2002 | Pandolfi | 361/685 |

* cited by examiner

Primary Examiner—Michael Datskovsky
(74) Attorney, Agent, or Firm—Robert B. Martin; Bracewell & Patterson, L.L.P.

(57) ABSTRACT

A slope of an HDD door comes in contact with a slope formed on a lower wall. At this time, when screws of the HDD door are fastened, a fastening force is generated at the HDD door in a direction parallel to the plane direction of the PC housing. The HDD united with the HDD door moves slightly in a parallel direction in proportion to the fastening degree of the screws. At this time, the slope slides to go up on the slope, so the HDD moves slightly upward. When the screws are fastened fully up to the allowable torque, the HDD is firmly attached to the upper wall.

7 Claims, 11 Drawing Sheets

PORTABLE ELECTRONIC APPARATUS, DISK DRIVE UNIT, LOADING MEMBER, AND COMPUTER HOUSING

BACKGROUND OF THE INVENTION

1. Technical Field

The present invention relates to a portable electronic apparatus, a disk drive unit, a loading member, and a computer housing. More particularly, the present invention relates to such a disk drive unit as a hard disk drive and a technique for loading the disk drive unit in a lap-top personal computer.

2. Description of the Related Art

Hard disk drive units (HDD) are the most popular external storage units employed for computers. Each hard disk drive unit is structured so as to dispose one or more magnetic disks on a single shaft and drive the disk(s) via a spindle motor. The hard disk unit has a magnetic head disposed so as to face each magnetic disk and read/write data from/on the disk. This magnetic head is driven by an actuator, generally by a voice coil motor. The magnetic disks, the magnetic heads, and the actuator are all housed in a housing referred to as an enclosure case.

Generally, such an HDD is attached to a personal computer (PC) by screws. Conventionally, however, there have been proposed various methods for attaching an HDD to a PC. For example, Published Unexamined Patent Application No. 11-73760 discloses an HDD whose position can be easily adjusted after it is fixed to a PC.

Because the HDD includes such dynamic mechanisms as a spindle motor for rotating magnetic disks and an actuator for a magnetic head, it is sensitive to impacts. Because lap-top PCs are often carried around, they receive more frequent and more intense impacts than desk-top PCs. Thus, a HDD installed in respective lap-top PCs is required to have higher resistance to impacts. To ensure such the high impact resistance, the HDD must be fastened firmly to the subject lap-top PC.

For current lap-top PCs, the HDD is configured by a 2.5-inch form factor. The representative value of this form factor is 100.2±0.25 mm (l)' 69.85±0.25 mm (w)' 9.5±0.2 mm (t). The lap-top PC body is provided with a space referred to as an HDD slot (or a medium bay or device bay), in which an HDD is loaded and fixed. The HDD is provided with a connector for sending/receiving data to/from external devices. This HDD connector is connected to a connector of the subject lap-top PC. Due to this connection to the lap-top PC via the connectors, the HDD is fixed to the PC more firmly. However, since this connection is insufficient to adequately fix the HDD to the PC, the HDD is also fixed by screws that go through the housing of the lap-top PC, and through the HDD slot vertically so as to provide adequate HDD impact resistance.

For conventional lap-top PCs, the HDD is fixed to the subject lap-top PC by fastening the bottom of the HDD housing to the lower wall of the HDD slot with screws. If screws are used in parallel to the plane direction of the PC, however, it is impossible to employ the conventional method that fixes the bottom of the HDD housing directly to the lower wall of the HDD slot of the lap-top PC with screws. Therefore, the fixing force is insufficient when case screws are only disposed in parallel to the plane direction to fix the HDD to the PC.

Elimination of any clearance between the HDD housing and the HDD slot allows the HDD to be fixed firmly to the lap-top PC. However, such a lack of clearance space between the HDD housing and the HDD slot results in difficulty in loading the HDD into the HDD slot, which is typically done manually. In the absence of adequate clearance, loading the HDD into the HDD slot becomes a more difficult, time-consuming task thus reducing lap-top PC production efficiency.

SUMMARY OF THE INVENTION

It is therefore an object of the present invention to provide a fixing structure for enabling the portable electronic apparatus to be thinned and such an electronic device as an HDD to be firmly fixed to the portable electronic apparatus such as a lap-top PC.

It is another object of the present invention to provide a disk drive unit, a loading member, and computer housing provided respectively with such a fixing structure.

The present invention also provides a loading member preferred for the computer apparatus of the present invention. Specifically, the present invention provides a loading member enabled to load and fix the disk drive unit in the slot of the computer housing. The loading member includes a fixing member for fixing itself to the disk drive unit and a slope member having a slope inclined along the direction for loading the disk drive unit in the slot. This loading member is inserted in the slot located in the housing of the computer while it is fixed to the disk drive unit. In case another member to slide on the slope is provided in this slot, it can function just like the conversion member that converts the displacement in the plane direction of the disk drive unit to the displacement in the direction vertical to the plane direction when the disk drive unit is loaded in the housing of the computer. And, in order to make it easier to load the disk drive unit into the slot, this loading member should preferably include a grip to be held when the disk drive unit is loaded in the slot.

Furthermore, the present invention provides such a housing preferred for the computer apparatus of the present invention. Concretely, the present invention provides the housing of the computer apparatus including a slot in which the disk drive unit is to be loaded. The housing includes an loading hole formed at the slot, an upper wall and/or a lower wall for partitioning the slot, and a slope member disposed in the slot and having a slope inclined along the loading direction from the loading hole. In case the disk drive unit to be loaded in the slot is provided with another member that slides on the slope, the member can function just like the conversion member for converting the displacement in the plane direction of the disk drive unit to the displacement in the direction vertical to the plane direction when the disk drive unit is loaded in the housing.

All objects, features, and advantages of the present invention will become apparent in the following detailed written description.

DETAILED DESCRIPTION OF THE PREFERRED EMBODIMENT

Figure 12:
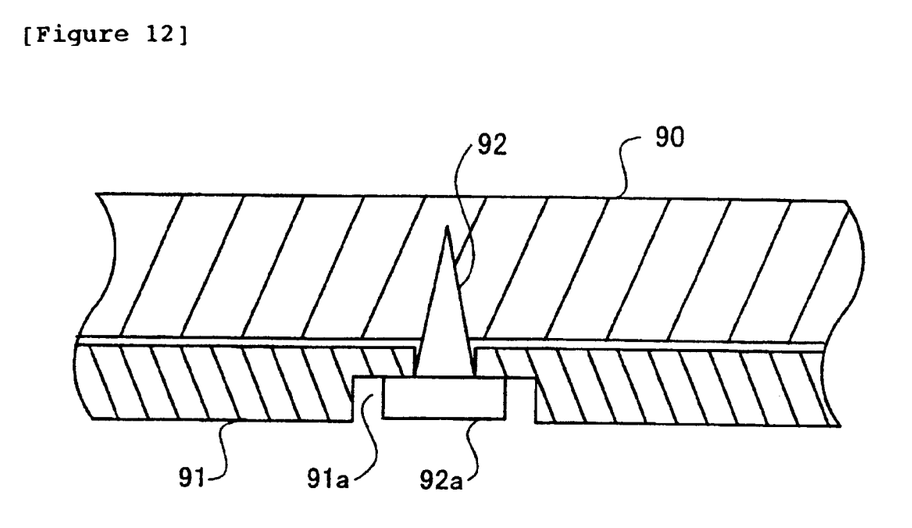
FIG. 12 illustrates a structure for fixing a conventional HDD.

The preferred embodiments of the present invention will be described herein with reference to the accompanying drawings. The lap-top PC has been attempted so as to be reduced more in weight and thickness, thereby improving its portability. The conventional method for fixing a HDD to a lap-top PC has been one of the problems in the process of further thinning lap-top PCs. FIG. 12 shows a cross sectional structure of an HDD attached to a PC by screws. In FIG. 12, reference numeral 90 denotes HDD housing, reference numeral 91 denotes lap-top PC housing, and reference numeral 92 denotes a screw. As shown in FIG. 12, a recess 91a is formed in the lap-top PC housing 91 so that the head 92a of screw 92 is prevented from direct extrusion from the outer surface of the PC 91. In case the head 92a of the screw 92 is exposed to the outer surface of the PC 91, the head 92a comes in contact with the surface on which the PC is placed, thereby introducing an unfavorable step on the placement surface. This condition is remedied by the recess 91a which is formed in the PC 91 with the head 92a being embedded therein. In order to form recess 91a, the PC housing 91 must be thickened according to the depth of the formed recess 91a thus posing a further obstacle to thinning the lap-top PC structure. The HDD must be fixed firmly to the subject lap-top PC. And, there has been no technique developed fix the HDD to the PC firmly in a manner that does not interfere with the goal of thinning the lap-top PC structure.

Figure 11:
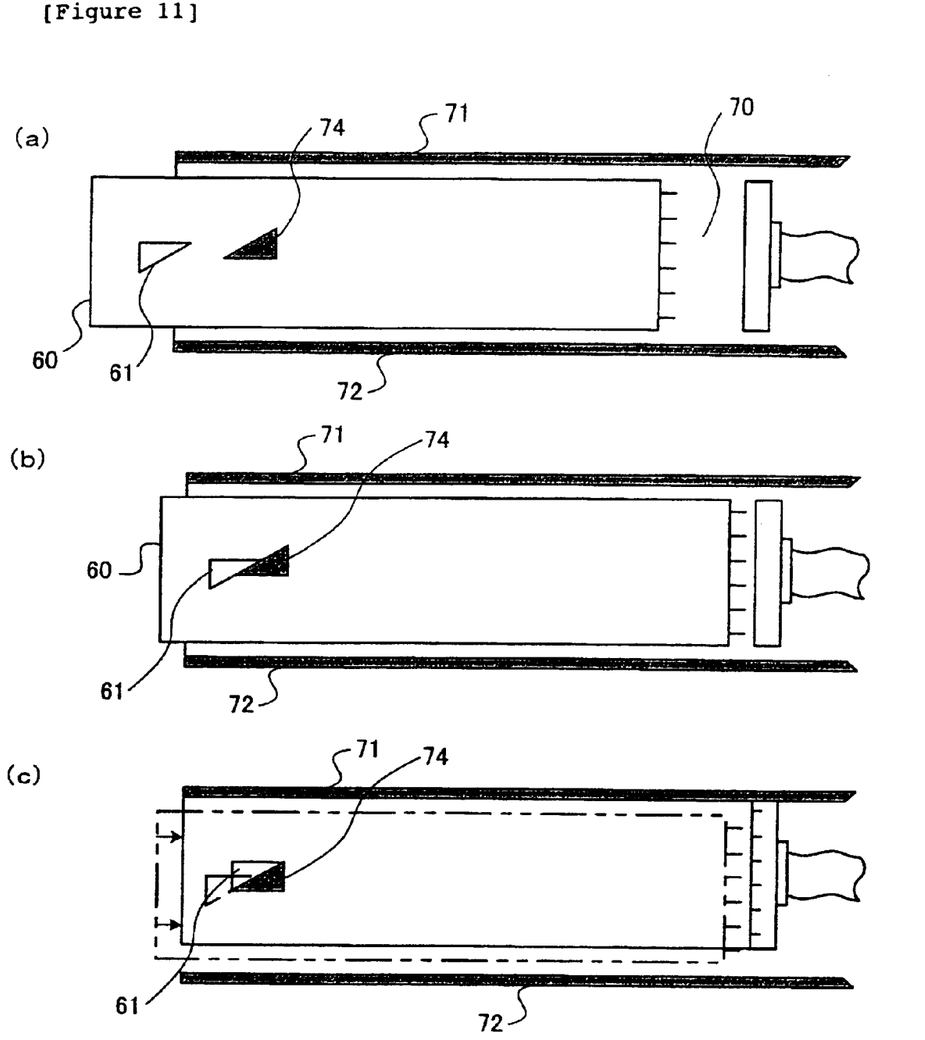
FIGS. 11a, 11b, and 11c sequentially illustrate loading of an HDD into an HDD slot in accordance with the teachings of the present invention.

The present invention provides a structure for fixing the HDD closely to the wall surface of the HDD slot step-by-step as the HDD is loaded in the HDD slot on the assumption that a predetermined clearance is formed between the HDD housing and the HDD slot. Hereinafter, this concept of the present invention will be described with reference to FIGS. 11a–11c. FIG. 11 is a side cross sectional view of the HDD 60 to be loaded in the HDD slot 70 of a lap-top PC. As depicted in FIG. 11, an HDD side slope member 61 is provided on a side surface of the HDD 60. The slope member 61 has a slope inclined from upper right to lower left and facing down. The HDD slot 70 is partitioned by an upper wall 71, a lower wall 72, and a pair of side walls (not illustrated). The HDD slot 70 includes a slot side slope member 74 having a slope inclined from upper right to lower left and facing down.

FIGS. 11a through 11c also illustrate a sequential order for loading the HDD 60 in the HDD slot 70 of the lap-top PC. As shown in FIG. 11a, when the HDD 60 is further inserted into the HDD slot 70, the slope of the HDD side slope member 61 comes in contact with the slope of the slot side slope member 74 as shown in FIG. 11b. And, when the HDD 60 shown in FIG. 11b is further inserted into the slot, the HDD side slope member 61 goes up on the slope of the slot side slope member 74. Consequently, the HDD 60 itself to which the HDD side slope member 61 is attached moves on the slope of the slot side slope member 74. The HDD 60 thus comes in contact with the upper wall 71 of the HDD slot 70 as shown in FIG. 11c.

As depicted in FIGS. 11a–11c, the present inventor proposes that the HDD 60 include the HDD side slope member 61, and that the HDD slot 70 include the slot side slope member 74 so that the HDD 60 comes in close contact with the upper wall 71 (or the lower wall 72) of the HDD slot 70 to enable sliding movements of both of those slope members 61 and 74. The HDD side slope member 61 and the slot side slope member 74 may be conversion members for converting a displacement of the HDD 60 in the plane direction to a displacement in a vertical direction.

In order to achieve the above object, therefore, the portable electronic apparatus of the present invention includes a housing having a slot in which an electronic unit is to be loaded and fixed while the electronic unit having a plane area and thickness that are predetermined; an electronic unit to be fixed in the slot; a fastening member for generating a fastening force in the direction for loading and fixing the electronic unit in the slot of the housing; and a conversion member for converting the displacement in the direction for loading the electronic unit in the housing to the displacement in the direction vertical to the plane area when the electronic unit is loaded in the housing.

The portable electronic apparatus of the present invention also includes fastening members, typically screws for generating a fastening force respectively in the direction for loading and fixing the electronic unit in the slot of the housing. Consequently, there is no need to fasten the electronic unit with screws in the direction vertical to the housing while it is needed conventionally. It is thus possible to make the portable electronic apparatus housing more thin in structure.

Furthermore, because the portable electronic apparatus of the present invention includes a conversion member enabled to convert the displacement in the direction for loading the electronic unit in the slot to the displacement in the direction vertical to the plane area, the electronic unit can be stuck closely to the upper or lower wall of the slot when the electronic unit is loaded in the slot. The conversion member can convert the displacement in the direction for loading the electronic unit in the slot to the displacement in the direction vertical to the plane direction according to the fastening action of each fastening member. This enables firm fastening of the electronic unit to the housing of the portable electronic apparatus thus reducing detrimental effects of impacts.

The conversion member of the portable electronic apparatus should have a slope as described with reference to FIG. 11. Specifically, the conversion member employed in the portable electronic apparatus of the present invention is configured by the first member moving by following the electronic unit and the second member disposed in the slot, and the first member and/or the second member has a slope at a predetermined angle from the direction for loading the electronic unit into the housing and another member goes up/down on the slope of the first or second member, thereby permitting the electronic unit to move in the direction vertical to the plane area. If a slope is formed on either the first member at the electronic unit side or on the second member at the housing side, the slope functions as the above conversion member.

The disk drive unit of the present invention provides the body of the disk drive unit with a slope inclined along the front end side from the rear end side thereof. Consequently, in case the housing of the computer apparatus is provided with a member sliding on this slope, the member functions just like the conversion member for converting the displacement in the plane direction of the disk drive unit to the displacement in the direction vertical to the plane direction when the disk drive unit is loaded in the housing of the computer apparatus. The slope may go up towards the front end side from the rear end side and go down from the rear end side towards the front end side.

The disk drive unit of the present invention may also include a loading member for loading the disk drive unit into the computer apparatus and the slope member may be configured by the loading member. In addition, the loading member may be formed unitarily with the housing of the disk drive unit.

The disk drive unit of the present invention is loaded and fixed in the computer apparatus by the fastening force of each screw. The body or the loading member has screw holes through which each screw goes in a direction parallel to the plane direction of the disk drive unit body. Because the screws are disposed in a direction parallel to the body of the disk drive unit even when the disk drive unit is fixed to the housing of the computer apparatus by screws, the present invention has an effect that can reduce the computer apparatus in thickness.

First Embodiment

Figure 1:
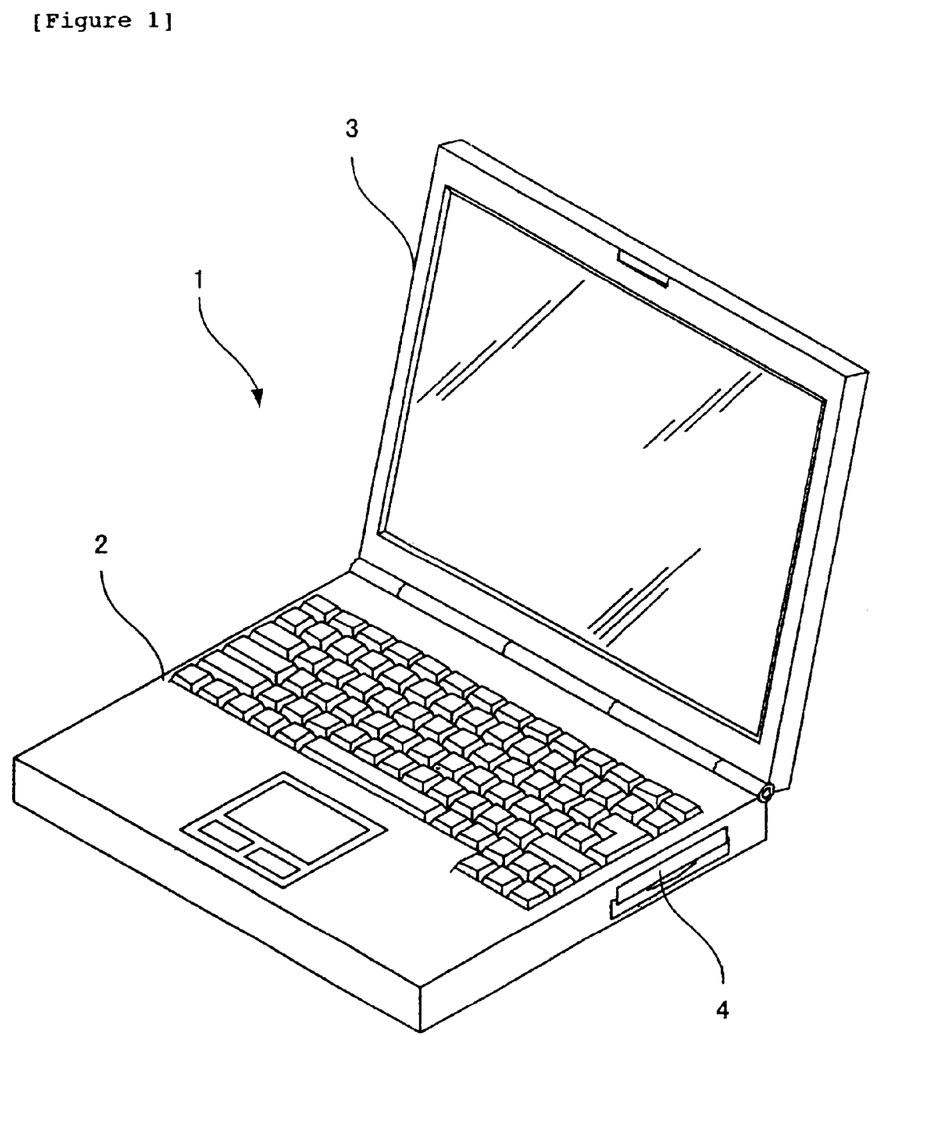
FIG. 1 depicts a lap-top PC in which a first embodiment of the present invention may be implemented.

FIG. 1 depicts a lap-top PC 1 in which a first embodiment of the present invention may be implemented. The lap-top PC 1 includes a PC body 2 and a liquid crystal display 3. In the PC body 2 is mounted an HDD 4, which is a disk drive unit used as an external storage device.

Figure 2:
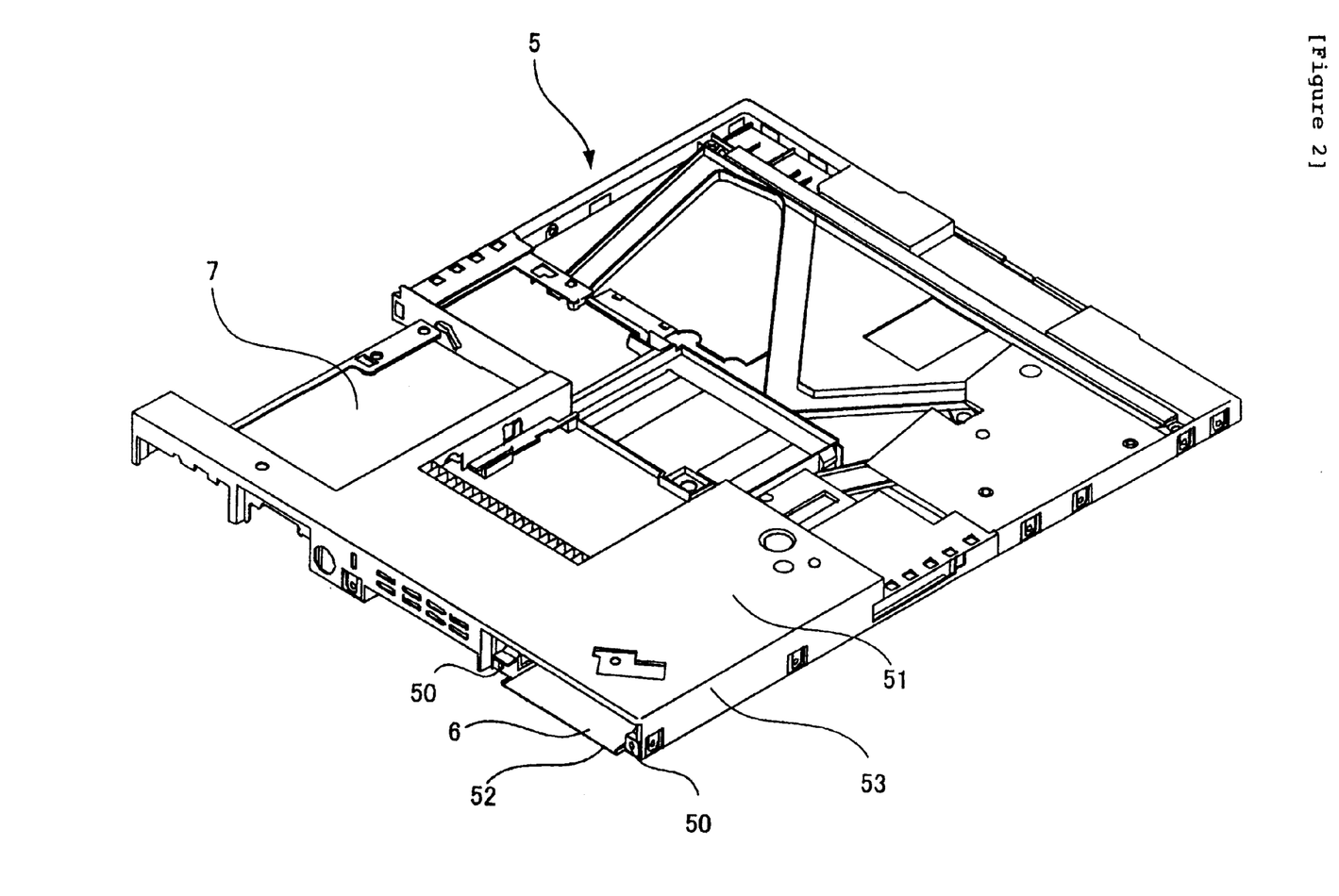
FIG. 2 illustrates a PC housing of the lap-top PC depicted in FIG. 1 in accordance with the first embodiment of the present invention.

FIG. 2 illustrates a PC housing 5 of the lap-top PC 1 depicted in FIG. 1 in accordance with the first embodiment of the present invention. The PC housing 5 is injection-molded with resin as a single item. In addition to an HDD slot 6, the PC housing 5 also includes a CD-ROM drive slot 7 for loading a CD-ROM drive therein. Because the HDD slot 6 is a space for housing the HDD 4, this space is partitioned by walls. The PC housing 5 in this embodiment includes an upper wall 51, a lower wall 52, a pair of side walls 53. At the loading hole of the HDD slot 6 are made screw holes 50 for fastening an HDD door 8 (to be described later) with screws 9.

Figure 3:
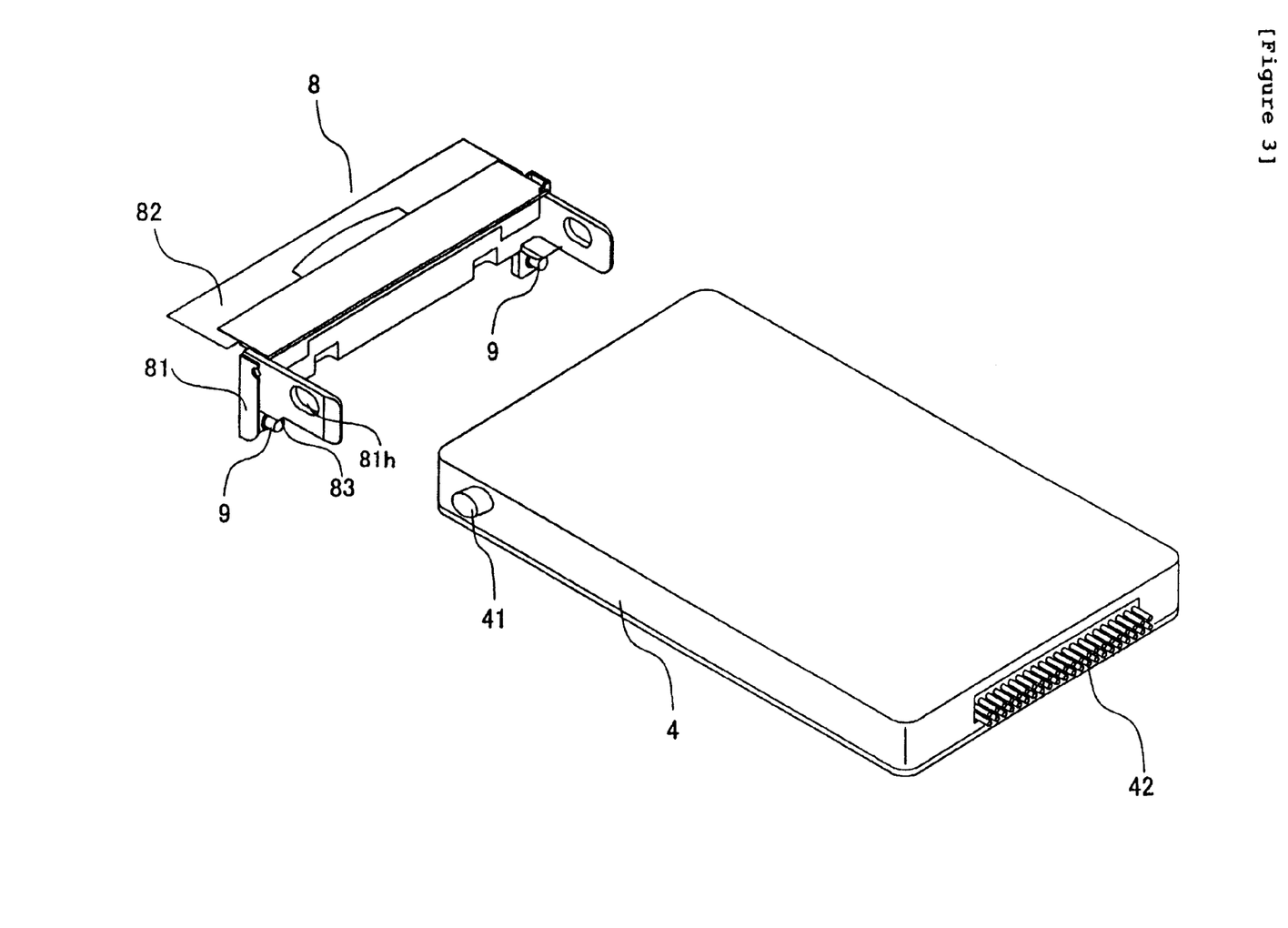
FIG. 3 depicts a perspective view of an HDD from which an HDD door is removed in accordance with the first embodiment of the present invention.
Figure 4:
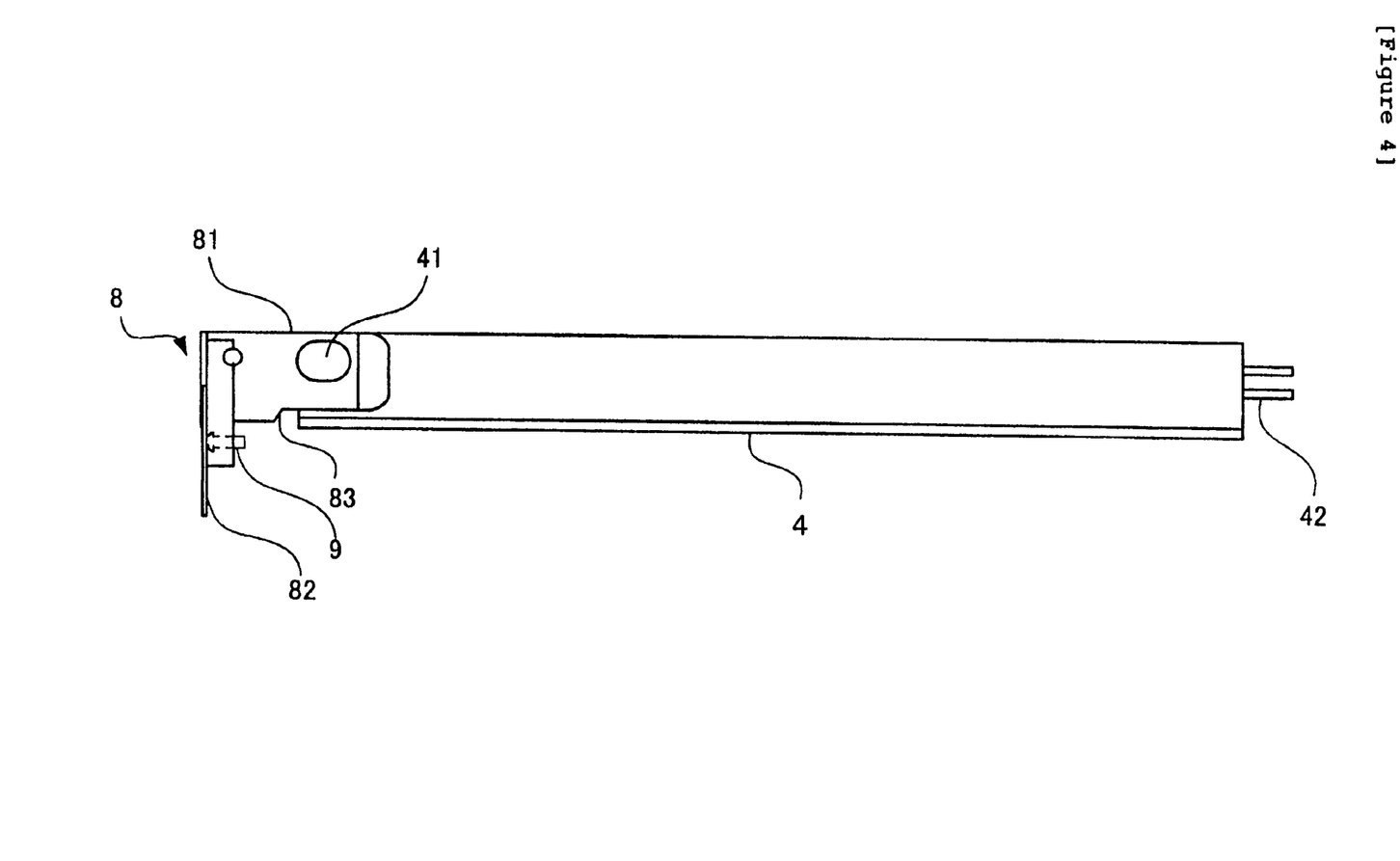
FIG. 4 illustrates a side view of the HDD to which an HDD door is attached in accordance with the first embodiment of the present invention.

FIG. 3 depicts a perspective view of an HDD 4 from which an HDD door 8 is opened in accordance with the first embodiment of the present invention. FIG. 4 illustrates a side view of the HDD 4 to which the HDD door 8 is closed in accordance with the first embodiment of the present invention. The HDD 4 has a plane area and thickness that are both predetermined. The HDD 4 is loaded in the HDD slot 6 located at the PC housing 5 of the PC body 2.

The HDD door 8 is a member for making it easier to load the HDD 4 in the PC housing 5, as well as positioning the HDD 4 closely to the upper wall 51 of the PC housing 5. The HDD door 8 is configured by a fixing member 81 and a door member 82. The fixing member 81 has holes 81*h*. The fixing member 81 also has a slope 83 coming in contact with a slope 54 of the PC housing 5 (to be described later). This slope 83 is inclined along the direction for loading the HDD 4 into the HDD slot 6, more concretely going down in the direction for loading the HDD 4 into the HDD slot 6. The fixing member 81 has screw holes in which the screws 9 for fastening the HDD 4 in the HDD slot 6 are set. The door member 82 is rotatably attached to the fixing member 81.

The HDD 4 also has projections 41 formed on both side walls. The projections 41 are embedded in the holes 81*h* of the HDD door 8 whereby the HDD door 8 is attached to the front end portion of the HDD 4. Also, a connector 42 is disposed at the rear end portion of the HDD 4.

When the HDD 4 is to be loaded in the HDD slot 6 of the PC housing 5, the door member 82 of the HDD door 8 is opened. In other words, it goes into the state shown in FIG. 3. The worker holds the grip of the opened door member 82 so as to load the HDD 4 into the HDD slot 6. To this end, the door member 82 also has a grip member to be held when the HDD 4 is loaded into the HDD slot 6.

Figure 5:
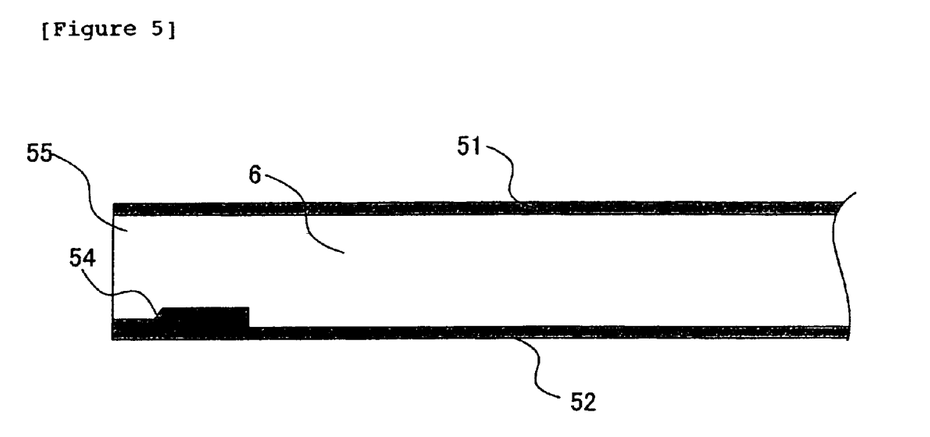
FIG. 5 depicts a cross sectional view of an HDD slot in accordance with the first embodiment of the present invention.
Figure 6:
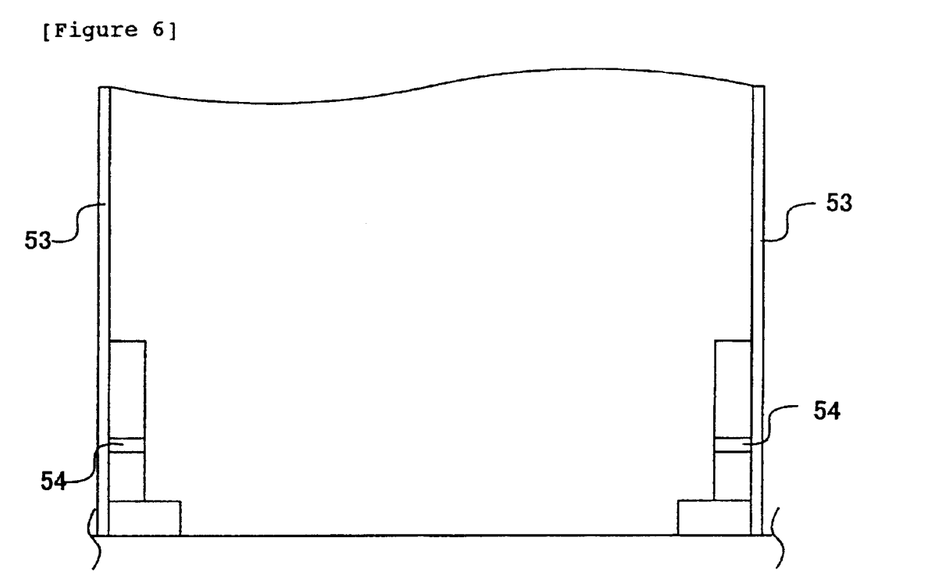
FIG. 6 illustrates a top view of an HDD slot in accordance with the first embodiment of the present invention.

FIG. 5 illustrates a cross sectional view of the HDD slot 6 in accordance with the first embodiment of the present invention. As shown in FIG. 5, the HDD slot 6 is partitioned by the upper wall 51 and the lower wall 52 in the top-bottom direction. The lower wall 52 has a slope 54. With reference to FIG. 6, there is depicted a top view of the HDD slot 6 of the PC housing 5. This top view indicates the HDD slot 6 from which the upper wall 52 is removed. As shown in FIG. 6, the slope 54 is formed so as to come in contact with both side walls 53 around the loading hole 55 for loading the HDD 4. This slope 54 is inclined along the loading direction from the loading hole 55, and more specifically, the slope goes up along the loading direction from the loading hole 55.

Referring to FIGS. 7*a*–7*c*, there is illustrated a sequential order for loading the HDD 4 into the HDD slot 6. FIG. 7*a* depicts the manner in which most of the HDD 4 is loaded in the HDD slot 6. Because a predetermined clearance is formed between the HDD 4 and the upper wall 51/lower wall 52, the HDD 4 can be loaded into the HDD slot 6 more easily. And, the door member 82 of the HDD door 8 is opened and the door member is held to load the HDD 4 into the HDD slot 6.

Figure 7:
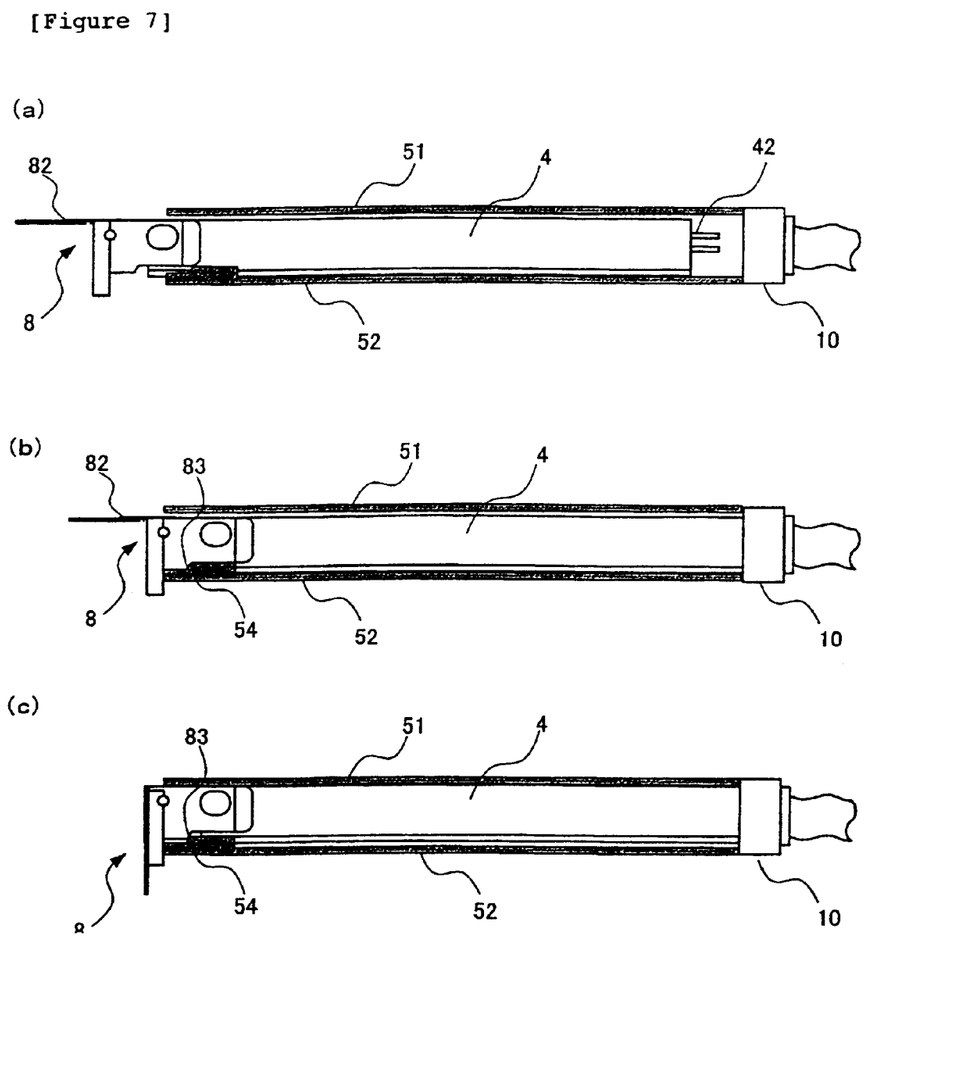
FIGS. 7a, 7b, and 7c provide a sequential depiction of how an HDD is loaded in an HDD slot in accordance with the first embodiment of the present invention.

As loading of the HDD 4 into the HDD slot 6 is continued, the slope 83 of the HDD door 8 comes into contact with the slope 54 of the lower wall 52 of the HDD slot 6. The slopes 83 and 54 are both inclined along the rear end portion from the front end portion of the HDD 4. At this time, the screws 9 (not illustrated in FIG. 7) set in the screw holes of the HDD door 8 go ahead through the screw holes 50 of the lower wall 52. When the screws 9 are fastened, fastening forces are generated in the right direction to the HDD door 8 in FIG. 7 (i.e., in a direction parallel to the plane direction of the PC housing 5). Consequently, the HDD 4 united with the HDD door 8 is moved a little in proportion to the fastening degree of each screw 9 in the direction parallel to the PC housing 5. Because the slope 83 slides and goes up on the slope 54 at this time, the HDD 4 also moves slightly in the upper direction shown in FIG. 7. In accordance with the first embodiment, the two slopes 54 and 83 are used as the conversion member for converting the displacement in the plane direction of the HDD 4 to the displacement in a direction vertical to the plane direction.

In this embodiment, the total height of the slopes 83 and 54 of the HDD door 8 and the lower wall 52 in the vertical direction is large enough to form the clearance between the HDD 4 and the upper wall 51 of the HDD slot 6. When the screw 9 is fastened to a predetermined torque, the HDD 4 is placed against on the upper wall 51 as shown in FIG. 7c. Because this placing requires pressing the HDD 4 against the upper wall 51 via the slopes 54 and 83 by means of the fastening force of the screw 9, the HDD 4 is fastened tightly. To avoid hindering HDD 4 front being pressed against the upper wall 51, the hole of each screw 9 formed at the fixing member 81 of the HDD door 8 is almost ellipse in shape so as to enable the screw to move in the vertical direction.

The HDD 4 has a connector 42 at its rear end. This connector 42 is connected to the PC side connector 10 and both of the connectors 42 and 10 are disposed at the rear end of the HDD slot 6. The connection between the connector 42 at the HDD 4 side and the connector 10 at the PC side is formed when the HDD 4 is loaded in the HDD slot 6 as shown in FIGS. 7a–7c. The PC side connector 10 allows a slight position change. Due to the rigidity of the connector 10 against the PC housing 5 is high, the rear end of the HDD 4 is fixed firmly to the PC housing 5.

As described above, in the first embodiment, the HDD 4 is fixed to the PC housing 5 with the screws 9 disposed horizontally to the PC housing 5. Consequently, unlike the conventional embodiment in which screws are disposed vertically to the PC housing 5, the first embodiment makes it possible to thin the PC body 2.

In addition, according to the first embodiment, when the screws 9 are fastened, the two slopes 54 and 83 mutually slide thus enabling the HDD 4 to rise so as to press firmly against the upper wall 51 of the PC housing 5. The HDD 4 is thus stuck on the wall 51 and fixed to the PC housing 5 strongly enough to safely withstand received impacts.

Second Embodiment

Figure 8:
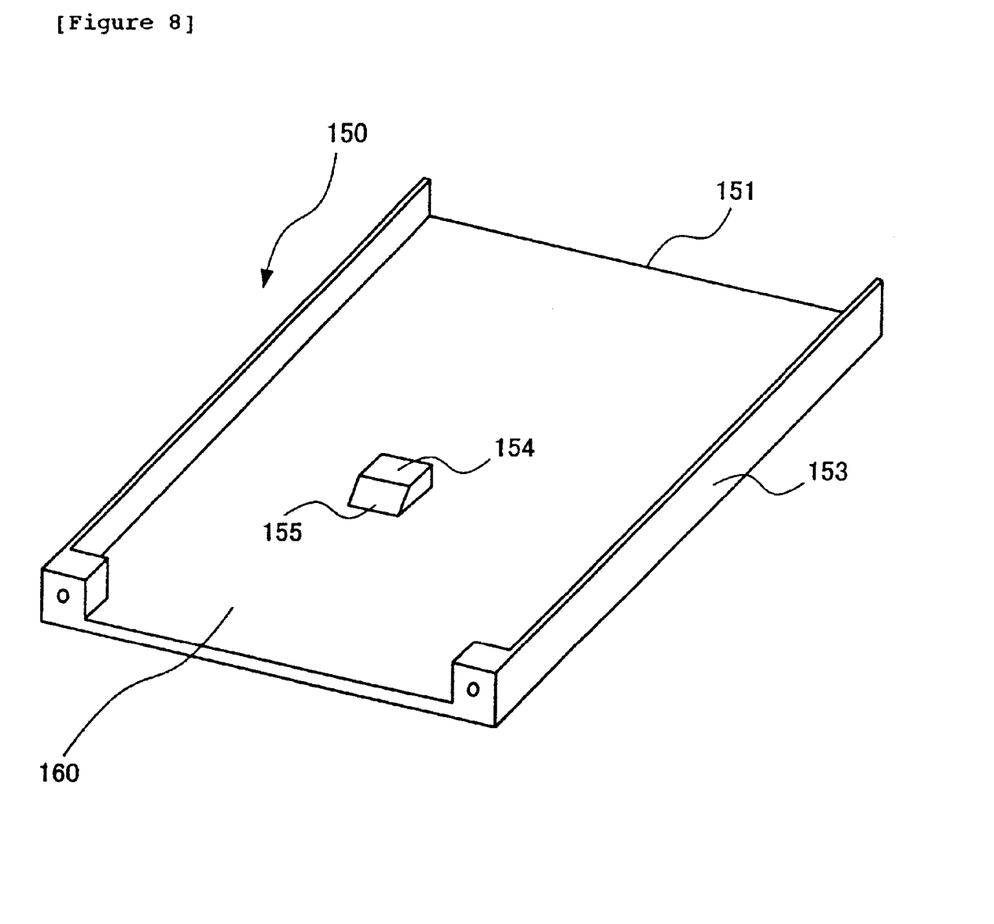
FIG. 8 illustrates a perspective inside view of an upper wall of an HDD slot in accordance with a second embodiment of the present invention.
Figure 9:
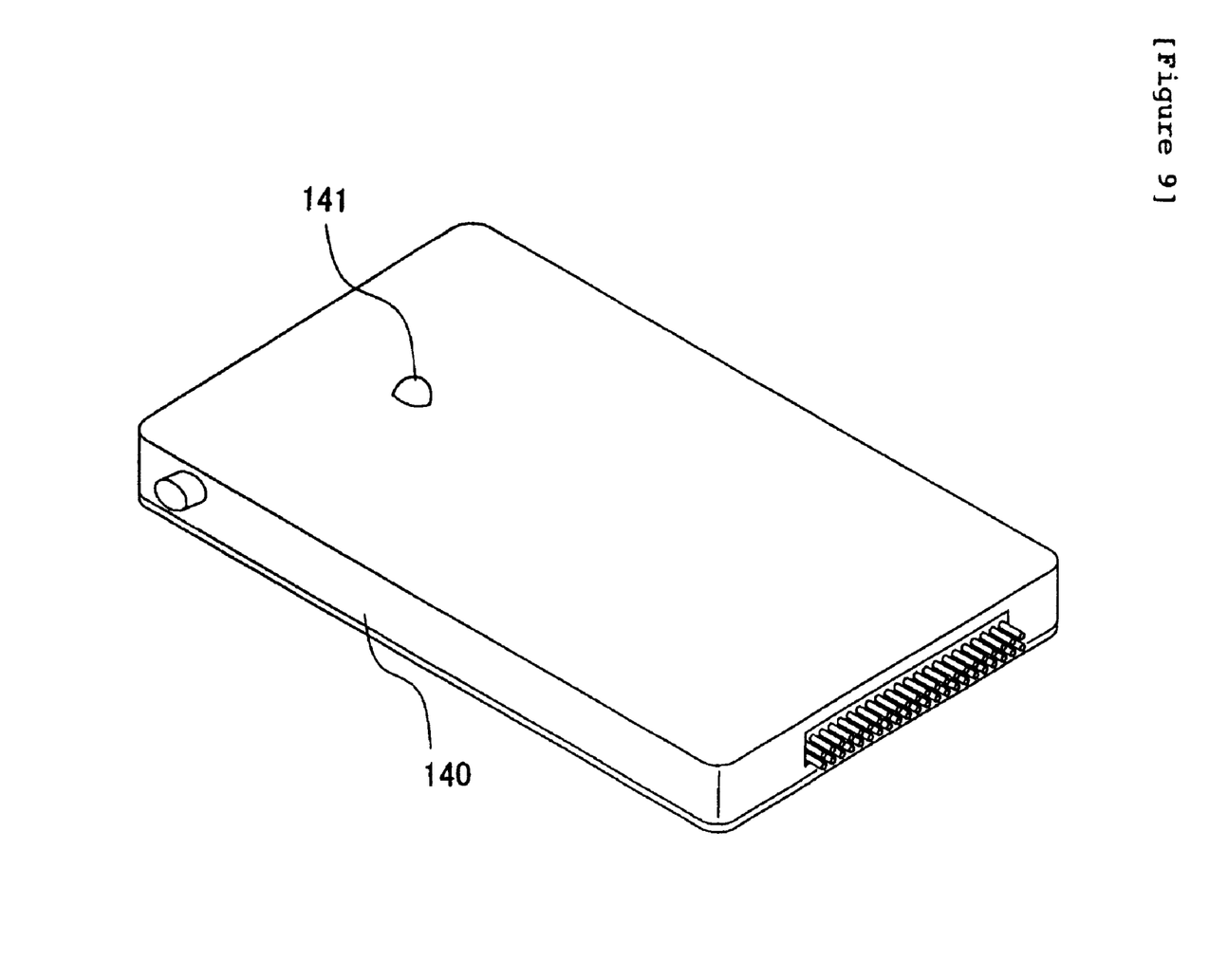
FIG. 9 depicts a perspective view of an HDD in accordance with the second embodiment of the present invention.
Figure 10:
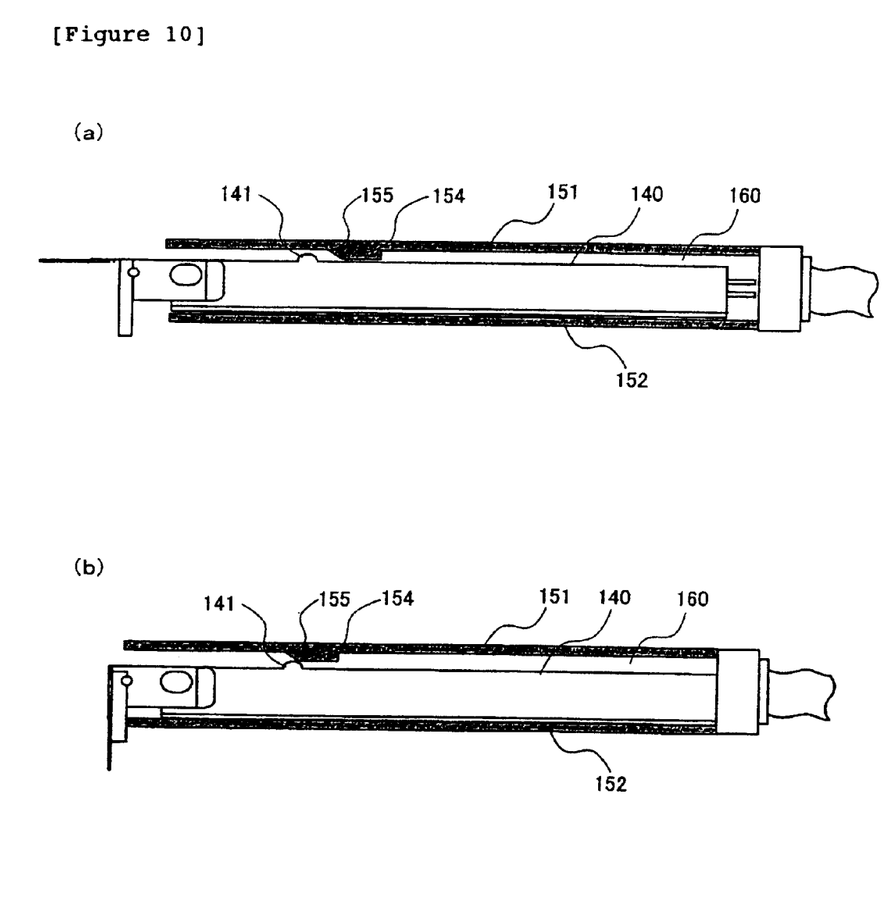
FIGS. 10a–10b sequentially illustrate a process for loading an HDD into an HDD slot in accordance with the second embodiment of the present invention.

A second embodiment of the present invention will hereinafter be described with reference to FIGS. 8 through 10. Referring to FIG. 8, there is depicted a perspective inside view of the upper wall 151 of the HDD slot 160 of the PC housing 150 in accordance with the second embodiment of the present invention. FIG. 9 illustrates a perspective view of the HDD 140 and FIG. 10 shows how the HDD 140 is loaded in the HDD slot 160 of the PC housing 150. FIG. 8 omits the illustration of the lower wall 152.

As shown in FIG. 8, the PC housing 150 includes the HDD slot 160 in which the HDD 140 is to be loaded. In the center of the width direction of the upper wall 151 that partitions the HDD slot 160 is provided with a slope member 154 having a slope 155 inclined in the direction for loading the HDD 140 into the slot 160. This slope 155 goes up in the loading direction from the loading hole (this side in FIG. 8) of the HDD 140.

As shown in FIG. 90, the HDD 140 has a hemispherical projection 141 thereon. In the second embodiment, this projection 141 slides down on the slope 155 formed in the HDD slot 160. This projection 141 may be formed unitarily with or separately from the housing of the HDD 140 so as to be fixed at a predetermined position of the HDD 140.

FIG. 10a illustrates a step in loading in which the HDD 140 is almost completely inserted in the HDD slot 160. A predetermined clearance formed between the upper wall 151 and the lower wall 152 of the HDD 140 makes it possible to load the HDD 140 into the HDD slot 160 easily. As the loading of the HDD 140 is continued, the projection 141 of the HDD 140 comes in contact with the slope 155 of the slope member 154 and the projection 141 slides down on the slope 155. Also in this second embodiment, the screws are disposed horizontally so as to fix the HDD 140 to the PC housing 150 just as in the first embodiment. When the screws (not illustrated) are fastened, therefore, the HDD 140 moves slightly in a direction parallel to the plane direction of the PC housing 150. At this time, the projection 141 slides on the slope 155, thereby the HDD 140 moves slightly in a direction vertical to the plane direction of the PC housing 150.

When the screws are fastened to a predetermined torque respectively, the HDD 140 sticks tightly to the lower wall 152 as shown in FIG. 10b. Because of the fastened screws, the joinder between those items is very strong. Also, just as in the first embodiment, since the screws are disposed in a direction parallel to the plane of the PC housing 150 so as to fix the HDD 140 to the PC housing 150, this embodiment makes it possible to thin the PC body.

In the second embodiment, the projection 141 is formed at the HDD 140. This means that the disposition of the projection 141 is comparatively free. Specifically, since the slope 83, which is equivalent to the projection 141, is formed at the HDD door 8 in the first embodiment, the position of the slope 83 is determined in the natural course of placement. However, in accordance with the second embodiment, the projection 141 can be formed at any position on the plane of the HDD 4. Consequently, the projection 141 can be formed at the optimized position according to the size, shape, etc. of the HDD 140.

Referring back to the first embodiment, two slopes 54 and 83 are used to stick the HDD 4 to the upper wall 51 tightly. In contrast, two slopes are not necessarily required as shown in the second embodiment. Forming a slope on one of the HDD 140 side and the PC housing 150 and providing a portion sliding over the slope on the other, can achieve the object of the present invention. Mutual sliding of two slopes may be used as a means for converting the displacement of the HDD 140 in the plane direction to the displacement in a vertical direction. Also, sliding of one slope on the non-slope surface of another member may be used as such the conversion member. A slope is not limited only to a plane—it may be a curved surface.

In the above first and second embodiments, an HDD is employed as a disk drive unit, which is an electronic unit of the present invention. The electronic unit of the present invention is not limited only to the HDD, however; it may be selected widely from various disk drive units such as a CD (Compact Disc) drive unit, a DVD (Digital Versatile Disc) drive unit, etc. usable as external storage units of computers, as well as other electronic units.

While a lap-top PC has been described as a portable electronic apparatus to which the HDD is to be connected in those first and second embodiments, the present invention may also apply to a desk-top PC, of course. And, it is also possible to apply the present invention to any of other electronic apparatuses than lap-top and desk-top PCs in case it incorporates a disk drive unit in itself.

What is claimed is:

1. A portable computer system comprising:
   a housing having a slot; and
   a loading member for loading a disk drive unit in said slot; and
   a slope member having a slope at a predetermined angle along a loading direction of said disk drive, wherein said slope member is formed on said loading member.

2. The portable computer system according to claim 1, wherein said computer system further includes a disk drive to be loaded within said slot, wherein said disk drive includes a body having a front end and a rear end, wherein said body is capable of being inserted in said computer apparatus from said rear end;

a loading member for loading said disk drive unit in said computer apparatus;

a slope member having a slope along a first side and a second side of said body, wherein said slope member is formed at said loading member.

3. The portable computer system according to claim 1, wherein said housing has an upper wall and/or a lower wall for partitioning said slot, and said computer system is in close contact with said upper or lower wall.

4. A disk drive unit to be attached/removed to/from a computer apparatus, said disk drive unit comprising:

a body having a front end and a rear end, wherein said body is capable of being inserted in said computer apparatus from said rear end;

a loading member for loading said disk drive unit in said computer apparatus;

a slope member having a slope along a first side and a second side of said body, wherein said slope member is formed at said loading member.

5. The disk drive unit according to claim 4, wherein said slope member is formed unitarily with said body.

6. The disk drive unit according to claim 4, wherein said disk drive unit is fixed to said computer by a screw.

7. A loading member for enabling a disk drive unit to be loaded in a slot formed within a housing of a computer apparatus, said loading member comprising:

a fixing member to be fixed to said disk drive unit;

a slope member having a slope inclined in one direction for loading said disk drive unit; and a gripping member to be gripped when said disk drive unit is being loaded in said slot.

* * * * *